United States Patent [19]
Cheris et al.

[11] Patent Number: 5,799,783
[45] Date of Patent: Sep. 1, 1998

[54] COMPACT DISC STORAGE CASE WITH LATCH-EJECT MECHANISM

[75] Inventors: Albert B. Cheris, Highland Park, Ill.; Robert B. Staubitz, Collinsville; Timothy Repp, New Hartford, both of Conn.; Dennis Tortorella, Arlington Heights, Ill.

[73] Assignee: Tenex Corporation, Elk Grove Village, Ill.

[21] Appl. No.: 730,405

[22] Filed: Oct. 15, 1996

[51] Int. Cl.⁶ ............................................. B65D 85/57
[52] U.S. Cl. ................................ 206/308.1; 206/310
[58] Field of Search ........................ 206/39.4, 308.1, 206/309, 311, 312, 776, 769; 312/9.11, 9.16, 9.17, 9.47, 9.48, 9.64

[56] References Cited

U.S. PATENT DOCUMENTS

| | | |
|---|---|---|
| 3,730,602 | 5/1973 | Campbell . |
| 3,789,160 | 1/1974 | Bruer et al. . |
| 3,823,948 | 7/1974 | Jenkins . |
| 3,860,248 | 1/1975 | Hunt et al. . |
| 4,655,344 | 4/1987 | Ackert . |
| 4,705,166 | 11/1987 | Ackert . |
| 4,717,019 | 1/1988 | Ackert . |
| 4,728,157 | 3/1988 | David . |
| 4,738,361 | 4/1988 | Ackert . |
| 4,747,484 | 5/1988 | Ackert . |
| 4,875,578 | 10/1989 | Nehl . |
| 4,875,743 | 10/1989 | Geardi et al. . |
| 4,964,510 | 10/1990 | Loyd . |
| 5,000,316 | 3/1991 | Lerner . |
| 5,011,010 | 4/1991 | Francis et al. . |
| 5,058,100 | 10/1991 | Yoshii . |
| 5,265,721 | 11/1993 | Casritis . |
| 5,334,904 | 8/1994 | Kramer . |
| 5,337,813 | 8/1994 | Ritter .................... 206/39.4 |
| 5,366,073 | 11/1994 | Turrentine et al. . |
| 5,385,235 | 1/1995 | Ikebe et al. . |
| 5,450,953 | 9/1995 | Reisman .................. 206/312 |
| 5,495,939 | 3/1996 | Castritis . |
| 5,505,299 | 4/1996 | Ditzig et al. . |
| 5,551,559 | 9/1996 | Roth et al. ............. 206/308.1 |
| 5,590,768 | 1/1997 | Hilton et al. ........... 206/308.1 |

*Primary Examiner*—David T. Fidei
*Attorney, Agent, or Firm*—Lockwood, Alex, Fitzgibbon & Cummings

[57] ABSTRACT

A compact disc storage case for storing a compact disc includes an interior storage compartment which receives the compact disc. A manually manipulatable latch/eject mechanism is incorporated in the storage case and includes an elongated latch/eject member which moves within the storage compartment between two positions. In one position, the latch/eject member engages the inner hole of the compact disc and in the other position, the latch/eject member disengages the disc and forces it partially out of the storage case. The storage compartment includes a ramp which the latch/eject member traverses in its movement between the two positions and the ramp forces the latch/eject member out of disengagement with the compact disc.

30 Claims, 4 Drawing Sheets

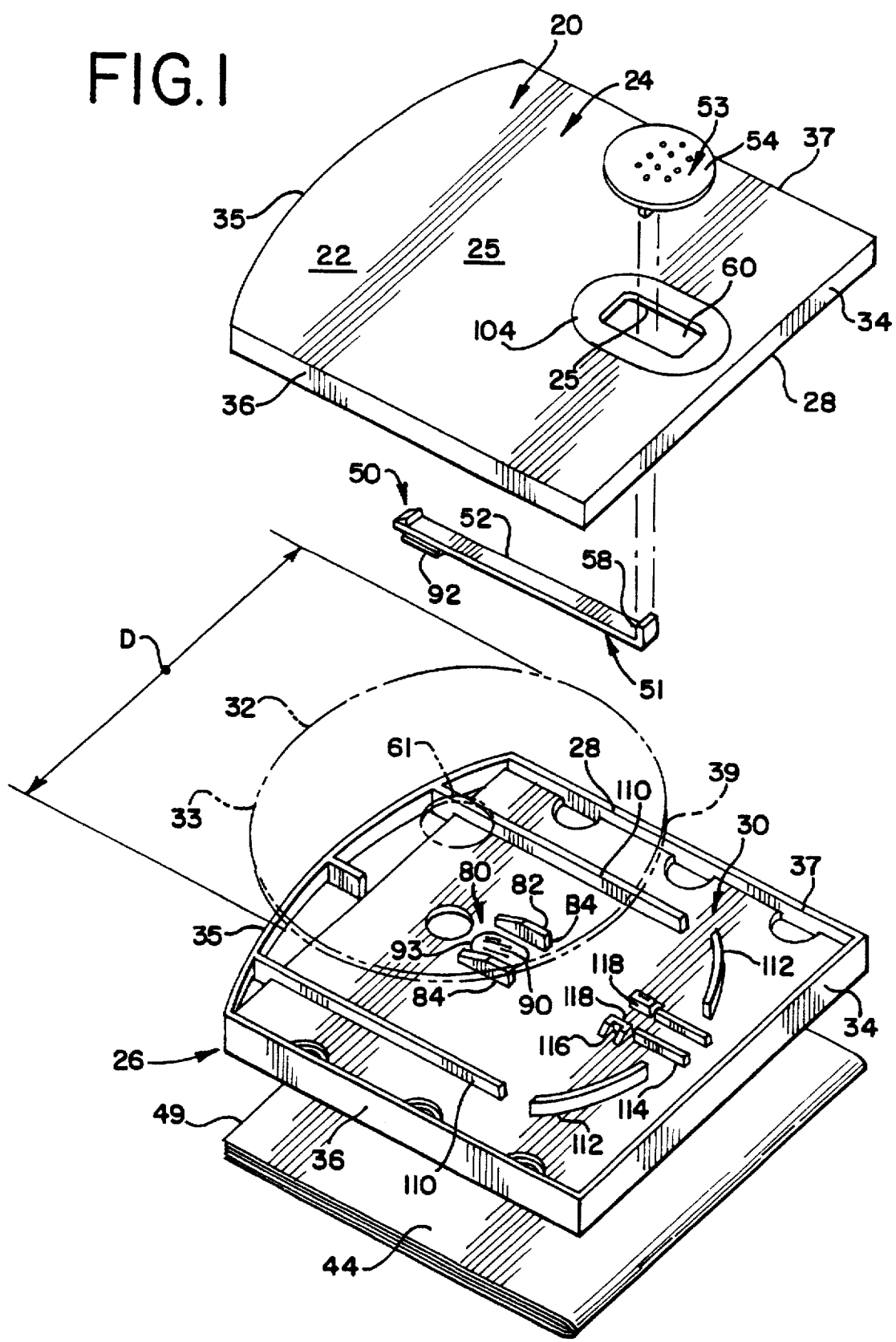

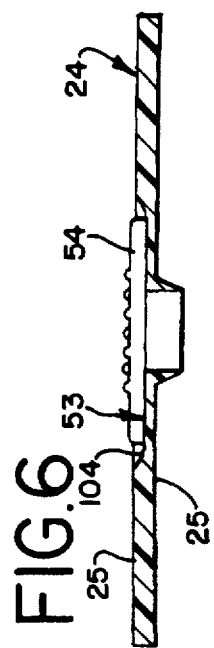
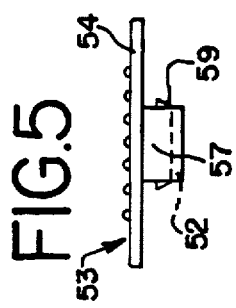
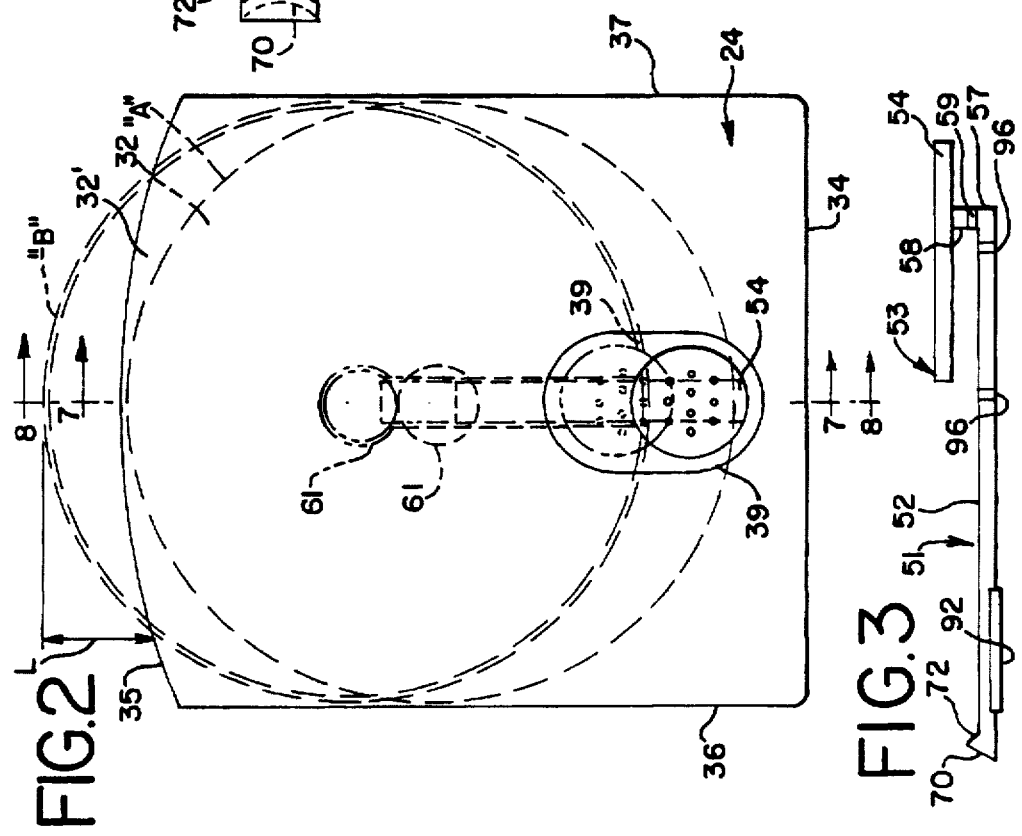

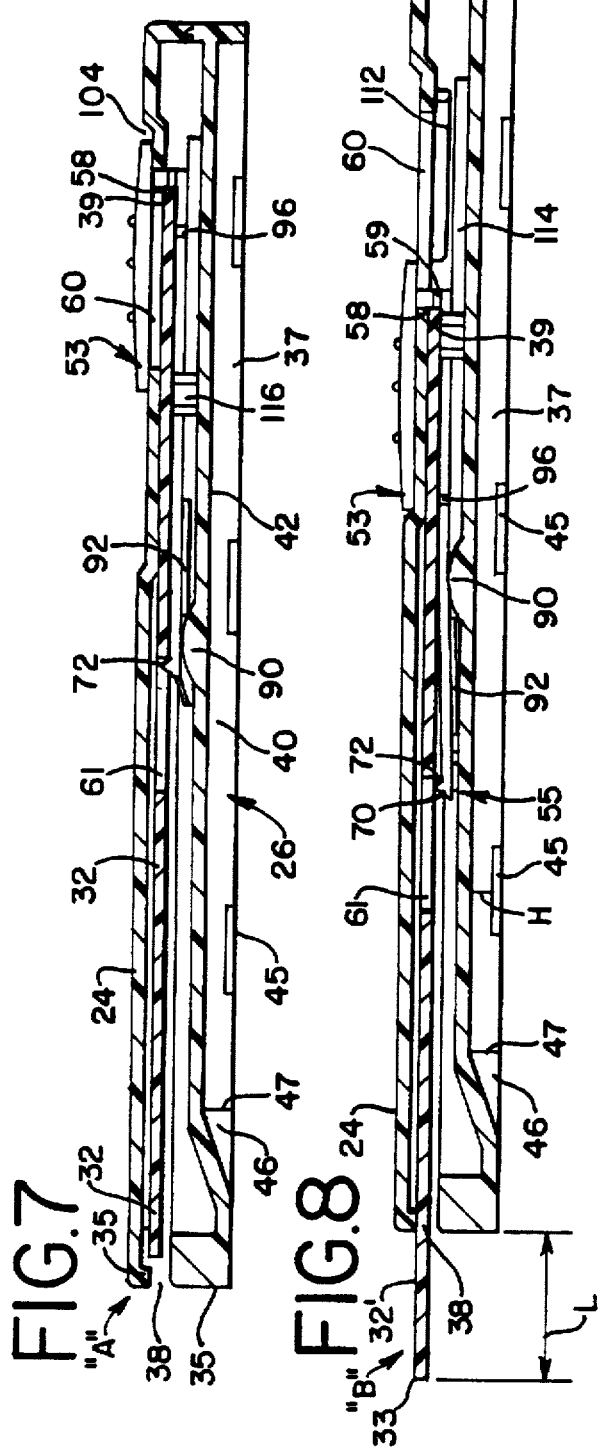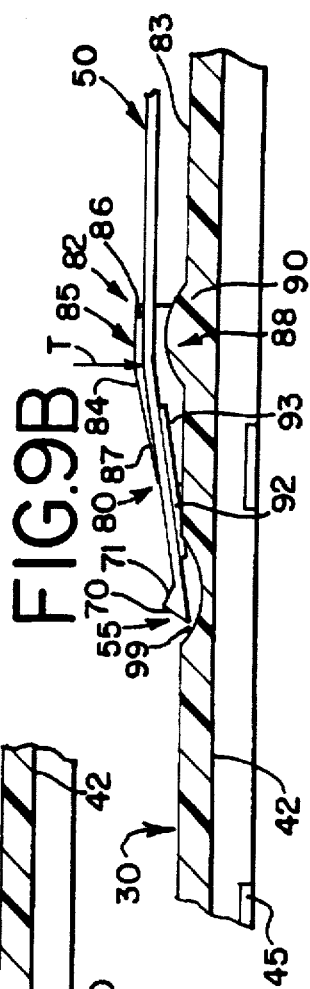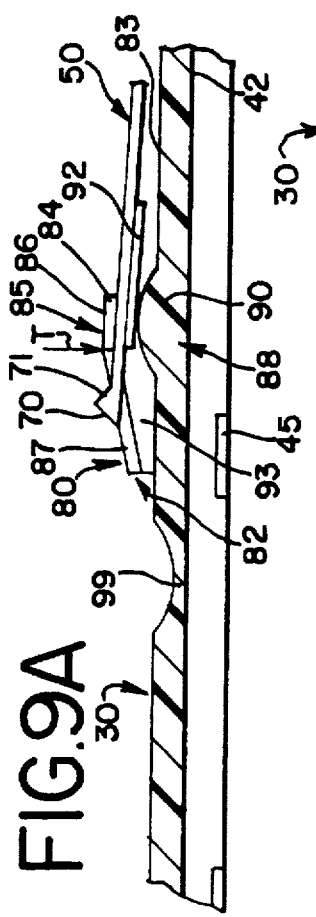

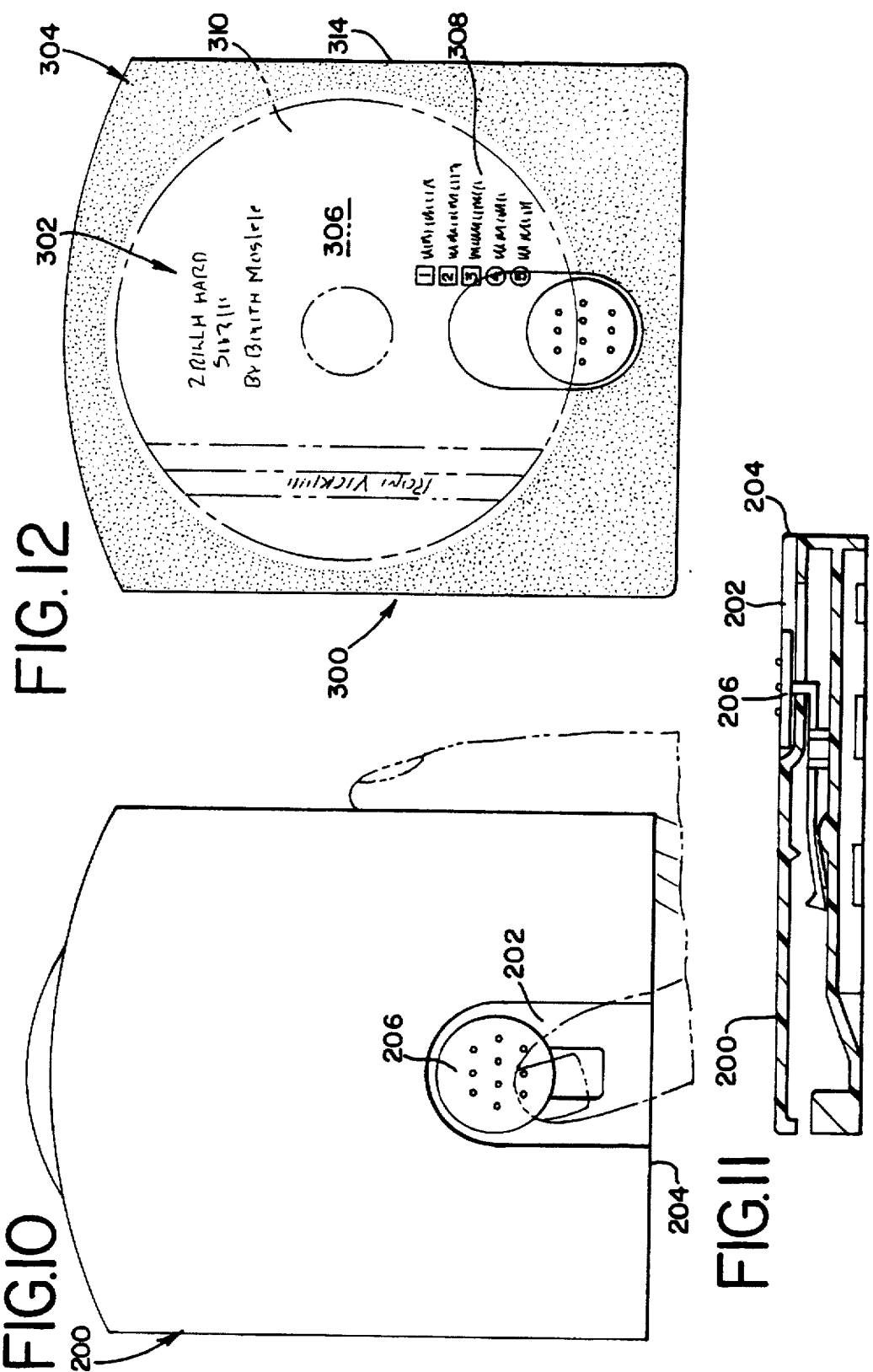

COMPACT DISC STORAGE CASE WITH LATCH-EJECT MECHANISM

BACKGROUND OF THE INVENTION

The present invention relates generally to storage containers for compact discs and more particularly to a compact disc storage container with a reliable and easily operable disc latch/eject mechanism.

Compact discs come in two different styles. In one style, the compact discs are used for recording and playback of digitally encoded audio material, such as music. In the other style, compact discs are used as read-only memory for storage of various data for computers or for computer games and programs. These compact discs are known in the trade and by the purchasing public by the acronym "CD-ROM".

The audio style compact discs are traditionally stored in light-weight, hinged plastic boxes, commonly known in the trade as "jewel boxes". These jewel boxes contain a cover and base portion hinged together. The cover typically contains printed material describing the songs on the audio disc and the base portion contains a platter with deflectable hub that engages the disc to hold it in place. These conventional jewel boxes are fragile and prone to breakage. Opening a jewel box requires a user to carefully pivot the cover, depress the hub and remove the disc. Although this procedure is not difficult, when performed in a car, it offers a distraction to a driver using his vehicle's audio compact disc player.

It is common for computer CD-ROMS to be packaged in cardboard boxes alone, without any jewel box or other similar compact disc storage container. The CD-ROMS must be taken out of the box every time a user wants to use the computer game(s) and/or programs held on the CD-ROMS. These CD-ROMS are thus subject to constant handling, and when the cardboard box is damaged or discarded, the user often leaves the CD-ROM sitting in a pile. This method of use promotes detrimental smudging or scratching the readable surface of the CD-ROM which may affect its readability by a computer. Accordingly, a need exists for a compact disc storage container in which the disc is easily accessible by a user and which protects the disc from damage and rough handling.

Some disc storage containers are known in the prior art. For example, U.S. Pat. No. 5,000,316, issued Mar. 19, 1991 describes a case for a compact disc having a tray with a carrier that holds a compact disc and a slider bar connected to the carrier so that when the slider bar is moved, the carrier ejects the disc out from the tray of the storage case. However, this construction is complex and requires a specially configured track for the slider bar to be molded in association with the tray. Additionally, this construction has no latching or similar means for positively retaining the disc in place within the case other than a conventional raised hub as found in conventional jewel boxes.

U.S. Pat. No. 5,505,299, issued Apr. 9, 1996 describes a compact disc storage case with a internal, slidable disc-supporting tray with delicate retention latches molded integrally therewith that catch on confronting projections. Although this latching mechanism works, it is noted that the latches are relatively thin, and may be prone to breakage over time under repeated use.

SUMMARY OF THE INVENTION

In view of the aforementioned need and the shortcomings of the prior art, it is therefore an object of the present invention to provide a storage container for compact discs which overcomes the disadvantages of the prior art and which has a reliable disc latch/eject mechanism.

Another object of the present invention is to provide a compact disc storage container having a disc housing formed from two opposing halves, the two housing halves cooperatively defining an interior storage space and having a slot opening through one thereof into the interior storage space, the container having a disc latch/eject mechanism which is manually manipulatable from the exterior of the storage container housing.

It is yet another object of the present invention to provide a compact disc storage case with a disc latch/eject mechanism that is operable between two positions, one position being an eject position wherein the compact disc is partially extended out of the case for access by the user, and the other position being a disc latch position wherein the compact disc is withdrawn into the storage case and is retained in place therein by the latch/eject mechanism.

Still another object of the present invention is to provide a storage case for compact discs having a manually manipulatable latch/eject member, the latch/eject member having an disc-engagement arm disposed within the storage case and slidable along a guide track, the guide track directing the disc-engagement head into and out of engagement with a compact disc as the disc engagement arm is moved linearly within the storage case between latch and eject positions.

Yet another object of the present invention is to provide a compact disc storage case having a disc ejection feature in which the storage case has a transparent portion approximately the size of a compact disc formed in the top of the case so that a user may read the label of the disc from the exterior.

These and other objects, features and advantages of the present invention will be clearly understood through a consideration of the following detailed description.

BRIEF DESCRIPTION OF THE DRAWINGS

In the course of the following description of the detailed description, reference will be made to the attached drawings wherein like reference numerals identify like parts and wherein:

FIG. 1 is an exploded view of one embodiment of a compact disc storage case constructed in accordance with the principles of the present invention;

FIG. 2 is a top plan view of the compact disc storage case of FIG. 1 when assembled and illustrating in phantom, the two positions assumed by the compact disc in respective latch and eject positions;

FIG. 3 is a side elevational view of the latch/eject member used in the storage case of FIG. 1;

FIG. 4 is a bottom plan view of the latch/eject member of FIG. 3, taken along lines 4—4 thereof;

FIG. 5 is an end elevational view of the latch/eject member of FIG. 3, taken along lines 5—5 thereof;

FIG. 6 is a partial sectional view of the top half of the storage case of FIG. 1 showing the latch/eject member in engagement with the slot of the top of the storage case;

FIG. 7 is a sectional view of the storage case of FIG. 2 taken along lines 7—7 thereof and illustrating the latch/eject member in a first operative position;

FIG. 8 is a sectional view of the storage arm of FIG. 2 taken along lines 8—8 thereof and illustrating the latch/eject member in a second operative position;

FIG. 9A is an enlarged detail view of the engagement between the latching end of the latch/eject member in a latching position and with the disc removed;

FIG. 9B is the same view as FIG. 9A but showing the latch/eject member in an eject position;

FIG. 10 is a top plan view of an alternate embodiment of a compact disc storage case constructed in accordance with the principles of the present invention;

FIG. 11 is a sectional view of a portion of the compact disc storage case of FIG. 10 with the disc removed; and, FIG. 12 is a top plan view of yet another alternate embodiment of a compact disc storage case in accordance with the present invention.

DESCRIPTION OF PREFERRED EMBODIMENTS

FIG. 1 illustrates a compact disc storage case 20 constructed in accordance with the principles of the present invention. As can be seen from the exploded view of FIG. 1, the case 20 includes a housing 22 formed from two opposing halves 24, 26. The housing halves 24, 26 are hollow so that when they are joined together at areas around their perimeters 28, an internal disc-receiving space 30 is formed in the storage case 20. This disc-receiving space 30 is large enough to enclose the entire compact disc 32 (shown in phantom in FIG. 1).

Each housing half 24, 26 has a rear wall 34, a front wall 35 and two sidewalls 36, 37 which interconnect portions of the rear wall 34 and front wall 35 together. As illustrated in the Figures, the rear wall and sidewalls 34, 36 and 37 may have a linear extent while the front wall 35 may have an arcuate extent. As seen in FIGS. 7 & 8, the front wall 35 of the housing half 24 includes a slot or opening 38 which extends for a substantial extent along the front wall 35 that is greater than the diameter D of the compact disc 32 so that the storage case 20 may receive the compact disc 32 in its entirety.

The housing bottom half 26 may have a recess 40 formed in its exterior surface 42 (FIGS. 7 & 8) which is sized to receive printed matter, preferably in the form of a booklet 44 which may describe the songs on the disc 32 where the disc is an audio compact disc or describe the programs on disc 32 where the disc is a CD-ROM. A booklet retaining means, shown illustrated as tabs 45 may be formed in the exterior surface 42 of the housing bottom half 26 or project outwardly from the sidewalls 36, 37. The tabs 45 are spaced apart from the exterior surface 42 by a distance H in order to retain the booklet 44 in place. A contoured ramp 46 may also be provided along the front edge 47 of the recess for a user to gain access to the front edge 49 of the booklet 44 in order to facilitate its removal from the storage case 20. Preferably, this ramp 46 is contoured to accommodate a user's finger.

The storage case 20 includes a manually manipulatable latch/eject mechanism 50 that extends within the internal disc-receiving space 30 of the case 20 manipulatable from the exterior of the case 20. This mechanism 50 includes an elongated latch/eject member 51 in the form of an arm 52 disposed entirely within the disc-receiving space 30 between the housing top and bottom halves 24, 26 which protrudes out of the case 20 through a slot 60 formed in the housing top half 24 and terminates in an actuator 53, shown as a button 54. The actuator 53 serves to move the latch/eject member 51 between two operative positions, "A" & "B" which are illustrated in plan view in FIG. 2 and illustrated respectively in sectional view in FIGS. 7 & 8.

In the first operative position "A" (FIG. 7), the disc 32 is retained within the case 20 in a manner in which the latch/eject arm 52 latches the disc 32 in place as explained in greater detail below. This position is represented in FIG. 2 by the disc 32 shown in phantom by the single dashed line. In the second operative position "B" (FIG. B), the disc 32', as shown in FIG. 2 in phantom by the double dashed line, is partially extended out of the case 20 so that a leading edge 33 thereof projects a sufficient distance "L" out of the slot 38 of the case 20.

Turning now to FIGS. 3–5, the details of the latch/eject member 51 are shown in greater detail. It can be seen that the latch/eject member 51 has an elongated latch/eject arm 52 and a forward latching end 55 and a rear end 56 that terminates in the actuator 53. The latch/eject member 51 is preferably made of one-piece construction and most suitably may be integrally formed by molding it as a single-piece from a plastic, such as polypropylene. The latch/eject arm 52 is offset from the actuator 53 by a vertical portion 57 that, as detailed below, forms a disc-engagement edge 58 of the latch/eject mechanism 51 against which the rear edge 39 of the compact disc 32 abuts. (FIGS. 7 & 8.)

This vertical portion 57 may include, as best seen in FIGS. 5 & 6, outwardly protruding catches 59 which serve to retain the latch/eject member 51 in place within the housing slot 60 by abutting against the interior surface 25 of the housing top half 24. This engagement assists in positioning the rear of the latch/eject member 51 at a preferred height or elevation in the housing interior space 30.

The forward latching end 55 of the latch/eject member 51 has an engagement portion disposed thereon which takes the form of a raised, arcuate segment 70 having a radius which approximates the radius of the inner hole 61 of the compact disc 32 so that when a disc is inserted into the case 20 by a user, the rear face 71 of the raised engagement segment 70 contacts the disc inner hole edge to draw the compact disc 32 rearwardly into the interior storage space 30.

In an important aspect of the present invention, the storage case 20 includes means for displacing the forward latching end 55 of the latch/eject member 51 into and out of engagement with the inner hole of the compact disc 32 as the latch/eject member 51 is moved between the two operative positions "A" and "B" shown in FIGS. 2, 7 & 8. This displacement means includes a guide track 80 positioned in the path of movement of the latch/eject member 51. The guide track 80 includes a pair of track rails 82 rising up from the base 83 of the housing bottom half 26. These track rails 82 include opposing, spaced-apart ramp members 84 having inwardly extending upper flange portions 85. As shown best in FIGS. 9A & 9B, the flange portions 85 may have two distinct portions 86, 87 which are joined together. The rearmost portion 86 is preferably generally horizontal and generally parallel to the bottom housing half base 83 while the forward portion 87 is preferably inclined as shown and described above.

A deflector 88, shown as a raised circular bead 90, is preferably positioned between the track rails 82 and extends over what may be considered as the dividing line, or transition T which occurs between the distinct flange portions 86, 87. This deflector 88 contacts the forward latching end 55 of the latch/eject arm 52 and urges it up against the level flange portions 86 and the inclined flange portions 87 as the latching end 55 moves linearly through and in the guide track 80. The forward latching end 55 of the latch/eject member 51 has two counterflanges 92 that extend laterally outwardly from the arm 52 of the latch/eject member 51 and that are received in the space 93 formed between the track rail flange portions 85 and the deflector 88. The flanges 85 thereupon guide the counterflanges 92 downward toward the bottom housing half base 83. (FIG. 9B.) This downward movement serves to release the forward latching end 55 from engagement with the inner hole of the compact disc 32, as shown in FIG. 8. The arm 52 of the latch/eject member 51 may be slightly canted, or inclined downwardly toward its forward latching end 55 to assist in the unlatching and ejection movement which occurs when the actuator 53 is moved forwardly. The housing base 83 may include a depression 99 aligned with the track rails 82 to accommodate the latching end 55 of the latch/eject member 51 in this downward movement.

The actuator 53 and the top surface of the button 54 may include a suitable gripping means 100, shown as a series of projections 102 which extend up from the button 54. These projections facilitate a user's manipulation of the actuator 53 by providing a positive engagement surface thereon. Other similar means may be used, such as serrations, ridges or the like. In order that the storage case 20 may fit into existing compact disc holders and storage devices, the housing top half 24 contains a depressed area 104 formed in its top surface 25 that surrounds the top housing slot 60 and actuator 53 held therein. As can be seen in FIG. 6, the depressed area 104 has a slightly curved profile and provides an open extent 105 around the actuator button 54 so that, in effect, the actuator button 54 does not ride along or is not guided by any particular defined surface of the top housing 24.

Returning to FIG. 1, the storage case housing bottom half 26 may include additional supporting structure, such as a pair of supporting rails 110 which the compact disc 32 may be supported on when inserted in the internal space 30. A pair of curved rails 112 may also be formed in either or both of the housing halves and serve as disc abutments or stops that provide a surface in the internal storage space 30 against which the compact disc 32 rests when retained in the storage case. A third set of rails 114 serve to support the rear portion of the latch/eject member 51.

Lastly, the supporting structure includes a pair of posts 116 that abut the lateral edges 95 of the latch/eject member. These posts 116 include detents 118 which project outwardly therefrom and which are preferably received in two pairs of complementary-shaped indentations 96 formed in the lateral edges 95 of the latch/eject member 51. The indentations 96 are preferably positioned so that the detents 118 of the posts 116 engage the indentations 96 at the forwardmost and rearmost extent of the stroke of the latch/eject member 51 which preferably correspond to the latch and eject positions "A" & "B" shown in FIGS. 7 & 8. The detents 118 engage the front set of indentations when the compact disc 32 is in its latched position "A", i.e., completely withdrawn into the storage case (FIG. 7), and they engage the rear set of indentations when the disc 32 is in its eject position "B", i.e. partially extending out of the storage case (FIG. 8). The indentations 96 may be spaced apart a distance equal to the length of the actuator slot 60.

FIGS. 10 & 11 show an alternate embodiment of a storage case 200 constructed in accordance with the principles of the present invention. This storage case 200 is generally the same in structure as the storage case illustrated in FIGS. 1–9 but differs in that the depression area 202 extends up to and meets with the rear wall 204 of the storage case 200. This permits a user to orient his finger to manipulate the actuator 206.

FIG. 12 illustrates another embodiment of a storage case 300 constructed in accordance with the present invention in which a portion 302 of the top half 304 of the storage case is formed from a transparent material to, in effect, provide a window 306 through which the user may view the relevant title and play selection 308 information on the disc 310, if desired. This transparent portion 302 may be formed in a variety of ways. It may be formed as a separate insert and placed into the top portion of the case 300 or, as illustrated, the case 300 itself may be formed from a transparent plastic with the outer portions 314 being stippled or crazed on its surface to cause the outer portion 314 to become semi-opaque.

It will be recognized then, that the present invention provide a simple compact disc storage case with a reliable disc ejection and retention mechanism having a unique latch/eject member that reliably engages the disc and retains it within the interior storage space of the case, yet easily releases it from engagement when the disc is ejected. The storage case may be easily mass-produced and formed from polypropylene, or other suitable plastics. Its construction lends itself to easy assembly of its three major components by unskilled labor.

It will be appreciated that the embodiments of the present invention discussed herein are merely illustrative of a few applications of the principles of the invention. Numerous modifications may be made by those skilled in the art without departing from the true spirit and scope of the invention.

We claim:

1. A storage case for a compact disc, comprising a housing having four walls defining an interior storage space of the housing, the four walls including a front wall, rear wall and two sidewalls interconnecting the front and rear walls, said front wall having a passage disposed therein opening to the interior storage space; a disc carrier operatively associated with said housing, the disc carrier including an elongated disc-engagement arm slidably disposed within said interior storage space, said disc carrier further including a manually manipulatable actuator slidably mounted on a first surface of said housing and interconnected to said disc-engagement arm, said housing first surface including an actuator slot defining a disc carrier slide path therein, said disc carrier being movable between first and second operative positions in said storage case, whereby when said disc carrier is in said first operative position, said disc-engagement arm engages said disc and retains it in place within said interior storage space and when said disc carrier is in said second operative position, said disc-engagement arm disengages said disc and forces said disc partially out of said storage case through said disc passage, said housing including disc-engagement arm guide means disposed within said interior storage space for guiding said disc-engagement arm in its movement between said first and second operative positions, said disc-engagement arm guide means including two opposing guide members disposed on opposite sides of and abutting said disc-engagement arm.

2. The compact disc storage case as defined in claim 1, wherein said housing includes a second surface which includes a recess for receiving printed matter associated with said compact disc and means for retaining said printed matter in place within said recess.

3. The compact disc storage case as defined in claim 1, wherein said actuator slot is generally rectangular.

4. The compact disc storage case as defined in claim 1, wherein said housing includes two opposing top and bottom housing portions and said actuator slot is disposed in the top housing portion.

5. The compact disc storage case as defined in claim 1, wherein said disc-engagement arm guide means further includes means for changing the level of said disc-engagement arm relative to said housing as said disc-engagement arm moves between said first and second operative positions to thereby move said disc-engagement arm into and out of engagement with said disc.

6. The compact disc storage case as defined in claim 5, wherein said guide means level changing means includes a pair of track rails which slidably engage said disc-engagement arm, said track rails cooperatively defining an inclined surface which impinges upon said disc-engagement arm as said disc-engagement arm travels between said first and second operative positions to change the level of said disc-engagement arm.

7. The compact disc storage case as defined in claim 1, wherein said actuator is disposed on said housing first surface proximate to said rear wall.

8. The compact disc storage case as defined in claim 7, wherein said housing first surface includes a depression and said actuator is disposed within said depression.

9. The compact disc storage case as defined in claim 8, wherein said depression extends from a point between said actuator and said housing front wall to said housing rear wall.

10. The compact disc storage case as defined in claim 1, wherein said guide members include a pair of spaced-apart rails aligned with said disc carrier, the rails defining a channel which receives said disc-engagement arm therein, said rails including opposing flanges, said disc-engagement arm including a pair of counterflanges that engage said rail flanges as said disc carrier moves between said first and second operative positions.

11. The compact disc storage case as defined in claim 1, wherein said housing includes a pair of posts disposed within said interior storage space, said posts including detents that engage said disc-engagement arm at locations corresponding to said disc carrier first and second operative positions.

12. The compact disc storage case as defined in claim 1, wherein a portion of said housing is transparent which thereby permits a user to view information printed on said compact disc without removing said compact disc from said storage case.

13. A storage container for a compact disc, the storage container comprising front and rear walls, two sidewalls spaced apart and interconnecting the front and rear walls together, said front and rear walls defining respective front and rear ends of said storage container, and top and bottom walls defining respective top and bottom portions of said storage container, said front, rear and two sidewalls cooperating to define an exterior perimeter of said storage container, said top, bottom, front, rear and sidewalls cooperating to define an interior space of said storage container for housing a compact disc therein, said storage container having a disc passage formed therein at said front end thereof which permits passage of the compact disc into and out of said storage container, said storage container further including a latch/eject mechanism for selectively latching the compact disc in place within said interior space and for partially ejecting said compact disc therefrom, the latch/eject mechanism including a manually manipulatable latch/eject member disposed within said interior space and having an actuator portion extendible along an exterior surface of said storage container which is movable between a first operative position at which said compact disc is engaged by said latch/eject member and retained in place within said interior storage space, and a second operative position at which said latch/eject member is disengaged from said compact disc and at least a portion of said compact disc is ejected from interior storage space through said disc passage, said storage container further including a guide track disposed within said interior space for guiding said latch/eject member in its movement between said first and second operative portions said guide track including means for changing the level of said latch/eject member as said latch/eject member is moved between said first and second operative positions to thereby move said latch/eject member into and out of engagement with said disc.

14. A storage container for a compact disc as defined in claim 13, wherein said storage container top portion includes an elongated slot formed therein communicating with said interior space, said latch/eject member extending through the slot and said actuator being slidably disposed above said slot, said slot defining the extent of travel of said latch/eject member between said first and second operative positions.

15. A storage container for a compact disc as defined in claim 14, wherein said latch/eject member includes an elongated disc-latching arm extending within said interior storage space from said top portion slot toward said storage container front wall.

16. A storage container for a compact disc as defined in claim 15, wherein said latching arm is joined to said actuator at a first end and extends therefrom into said interior storage space.

17. A storage container for a compact disc as defined in claim 16, wherein said latching arm includes a cantilevered body portion which extends from said first end thereof to a free end, the latching arm free end including means for engaging an inner hole of said compact disc.

18. A storage container for a compact disc as defined in claim 13, wherein said latch/eject member level changing means further includes a ramp disposed within said interior storage space and spaced apart from said disc passage, the ramp being aligned with said latch/eject member and interposed in a path of travel of said latch/eject member, said ramp engaging said latch/eject member as it moves from said first operative position to said second operative position.

19. A storage container for a compact disc as defined in claim 18, further including a slot formed in said storage container top portion which communicates with said interior storage space, said ramp being disposed intermediate said slot and said front end of said container.

20. A storage container for a compact disc as defined in claim 13, wherein said storage container top portion includes a transparent portion aligned with information printed on an informational surface of said compact disc, thereby permitting said information on said compact disc to be read from exterior of said storage case.

21. A case for storing a disc, comprising:
  a housing defined by a plurality of walls, the housing having an internal storage compartment for storing a disc, said housing having disc opening in one of said walls which permits passage of the disc into and out of said storage compartment;
  a disc carrier slidably mounted in said housing and movable within said housing between first and second operative positions, the disc carrier having a carrier body portion and an actuator portion, said carrier body portion being enclosed within said storage compartment and adapted to carry said disc within said storage compartment said actuator portion resting on an exterior surface of said housing;
  a slot formed in said housing defining a travel path for said disc carrier, the slot extending generally transverse to said housing disc opening such that as said carrier is slid toward said housing disc opening, said disc is partially ejected from said housing; and, said housing including means disposed therein for guiding said carrier body portion during movement of said disc carrier in its movement between said first and second operative portions, and ramping means associated with said guide means for ramping said carrier body portion between first and second predetermined levels with respect to said housing as said disc carrier is moved between said first and second operative positions whereby, when said disc carrier is in said first operative position, said carrier body portion occupies a first predetermined level within said storage compartment where said carrier body portion engages said disc and retains it in place within said storage compartment, and when said disc carrier is in said second operative position, said carrier body portion occupies a second predetermined level within said storage compartment where said carrier body portion disengages said disc.

22. The disc storage case of claim 21, wherein said disc carrier includes an elongated arm joined to said actuator portion by an interconnecting portion, the interconnecting portion providing a stop against which said disc rests when carried by said carrier.

23. The disc storage case of claim 21, wherein said disc carrier includes an elongated arm joined to said actuator portion, at a rear portion of said carrier, the arm having a disc engagement edge disposed at a front portion of said carrier, the disc engagement edge being disposed thereon in a confronting relationship with an inner hole of said disc.

24. A compact storage disc case, a housing having a plurality of walls, an internal storage cavity disposed within said housing, a opening in one of said housing walls defining a passage which accommodates the passage of a compact disc therethrough to said cavity, a disc carrier having a carrier arm and an actuator button, the carrier arm being disposed within said cavity and moveable therewithin, the actuator button being slidably disposed within a depression located on an exterior surface of one of said housing walls, said carrier arm and actuator button being joined together, the depression extending toward a rear wall of said housing providing access to said actuator button from said housing rear wall said housing including a pair of elongated guides disposed within said internal storage cavity on opposite sides of said carrier arm and in contact therewith to thereby guide said carrier arm in movement within said internal storage cavity.

25. A storage case for housing a compact disc, the compact disc having a visually-readable surface with identifying indicia printed thereon, the storage case comprising:

a housing having a plurality of walls, a slot formed in one of the housing walls through which said compact disc may be placed into and removed from said storage case, one of said housing walls having a transparent portion that has a size and configuration approximating that of said compact disc visually-readable surface and further being aligned therewith to thereby permit said information on said compact disc to be read by a user from exterior of said storage case, said storage case further including an internal compact disc carrier disposed within a guide track disposed within said housing, said internal compact disc carrier being moveable within said housing between two positions in which said internal compact disc carrier engages said compact disc and retains said compact disc within said housing and in which said internal compact disc carrier partially ejects said compact disc from said housing and disengages said compact disc, said guide track further including means dispoed in proximity to said guide track for engaging and disengaging said internal compact disc carrier from said compact disc during movement of said internal compact disc carrier.

26. The compact disc storage case as defined in claim 25, wherein said transparent portion is formed integrally said one housing wall.

27. The compact disc storage case as defined in claim 25, wherein said transparent portion has an area which approximates said visually-readable surface.

28. A storage container for a compact disc as claimed in claim 13, wherein said guide track includes a pair of rails disposed on opposite sides of said latch/eject member and in engagement therewith, and said means for changing the level of said latch/eject member including portions of said guide track rails that cooperatively define an inclined surface that said latch/eject member engages in its travel between said first and second operative portions.

29. The disc storage case of claim 21, wherein said carrier body portion guiding means includes a pair of guide members disposed within said housing on opposite sides of said disc carrier and in contact therewith, and said ramping means includes a pair of flanges formed on said guide members, said flanges cooperating to form an inclined surface against which said disc carrier slides in its movement between said first and second operative positions.

30. The compact disc storage case of claim 24, wherein said carrier arm includes a forward engagement end for engaging a center hole of a compact disc, and said carrier arm is movable between a first position where a compact disc held by said carrier arm is retained entirely within said internal storage cavity and engaged by said engagement end and a second position where said carrier arm engagement is released from engagement with said compact disc.

* * * * *